June 3, 1941.  C. C. EAGLESFIELD ET AL  2,244,003
SAWTOOTH OSCILLATOR
Filed July 26, 1938  2 Sheets-Sheet 1

INVENTORS
CHARLES C. EAGLESFIELD
AND JOHN ARCHER
BY
ATTORNEY.

June 3, 1941.  C. C. EAGLESFIELD ET AL  2,244,003
SAWTOOTH OSCILLATOR
Filed July 26, 1938   2 Sheets-Sheet 2

INVENTORS
CHARLES C. EAGLESFIELD
AND JOHN ARCHER
BY
*W. S. Smith*
ATTORNEY.

Patented June 3, 1941

2,244,003

UNITED STATES PATENT OFFICE 2,244,003

SAWTOOTH OSCILLATOR

Charles Cecil Eaglesfield and John Archer, Mitcham Junction, Surrey, England, assignors to Radio Corporation of America, a corporation of Delaware

Application July 26, 1938, Serial No. 221,333
In Great Britain July 27, 1937

2 Claims. (Cl. 250—36)

This invention relates to linear time bases for cathode ray tubes and more particularly, but not exclusively, to linear time bases for the cathode ray tubes of television receivers. The usual time base for this purpose comprises a condenser which is charged at constant current and is periodically discharged by means of a glow-discharge tube, a gas-filled triode or a more complicated circuit involving hard valves. In all these cases the circuit is comparatively complex and inefficient and accordingly the object of this invention is to provide a circuit which, while more efficient in operation, is extremely simple and economical in components.

Figure 1:
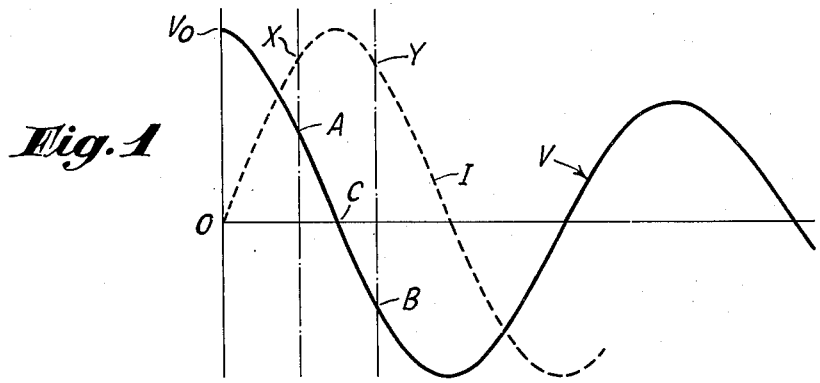
Figure 2:
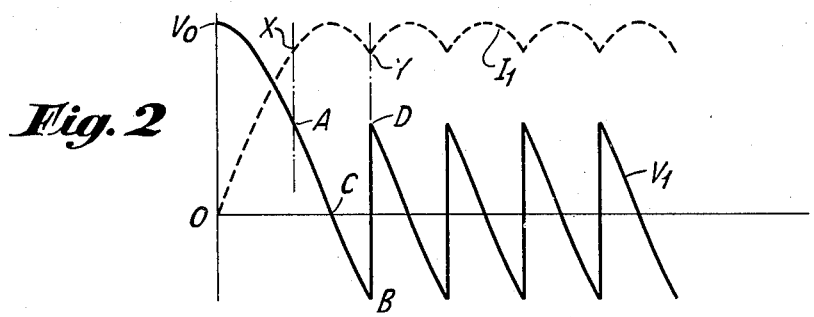

According to the invention which is illustrated in the drawings in which Figs. 1 and 2 are theoretical curves and Figs. 3–7 illustrate embodiments of the invention, this object is achieved by not using a condenser alone but employing in place thereof an oscillatory circuit comprising both inductance and capacity, the operation of this oscillatory circuit being periodically interrupted and recommenced in such manner that a substantially linear portion of the current or voltage curve is obtained for use, at the desired frequency, as the operative beam-traversing stroke of the desired sawtooth wave. If the interruptions were not effected the oscillation curve, i. e. the curve of current or voltage with respect to time, would be a damped sine-wave, but over a restricted part of the wave, i. e. a part disposed approximately symmetrically about the zero line, the curve is substantially straight, and it is this part of the curve that is "extracted" by the interruptions. The inoperative or "fly-back" stroke occurs during the time that the circuit is being prepared for repeated operation. This method enables us to simplify the circuit and, as will be explained hereinafter, permits us to provide an efficient time base utilizing only one discharge tube.

Before proceeding to give examples of the manner in which the invention may be carried into practical effect, we will describe the theory upon which it is based with reference to the curves appearing in Figs. 1 and 2 of the accompanying drawings. If a condenser C is charged up to a potential Vo and allowed to discharge through inductance L, the series resistance being designated R, and if $$\frac{1}{LC}$$

is greater than $$\frac{R^2}{4L^2}$$

the voltage V across the condenser is, as is well known, a damped harmonic wave as shown in Fig. 1 by the full line V. It is clear from the curve that a section AB of the curve, symmetrical in time about the zero-value C, may be selected to be approximately straight. The current I flowing in the oscillatory circuit L, C, R will commence from the zero value and lag approximately 90° behind the voltage as represented by the dotted curve in Fig. 1. The variation in current during the interval of time corresponding to the change in voltage from A to B, i. e. the distance along the abscissa between the two dot-and-dash lines, is represented by the section XY of the curve. If when the voltage B is reached the condenser is rapidly recharged not to the initial potential Vo but to potential A, as shown by the line BD, and then allowed to discharge again through the inductance, the current in the inductance will not change appreciably during the recharging period. The current during the second discharge of the condenser will therefore commence from the value Y and will repeat the wave-form XY, so that if the sequence of operations is continued a current wave $I_1$ of the form shown in Fig. 2 will be obtained. The corresponding voltage wave-form will consist of repetitions of section ACB joined by vertical lines (assuming instantaneous condenser charging) as shown in Fig. 2 by the full line $V_1$. It can be seen that a sawtooth voltage wave-form results, the sawtooth being substantially linear at the center and slightly non-linear at the ends.

It can be seen that when the initial operations are completed the current in the inductance consists of a large and steady D. C. component and a small varying component superimposed thereon. If the section XY is decreased, the proportion of the varying current component to the steady component also decreases. In general, therefore, if the inductance L is iron-cored (as it usually will be) it is only necessary to consider the steady component for design purposes. Since this component can only come from the external charging source it is a measure of the average current taken from the charging source and vice versa.

Figure 3:
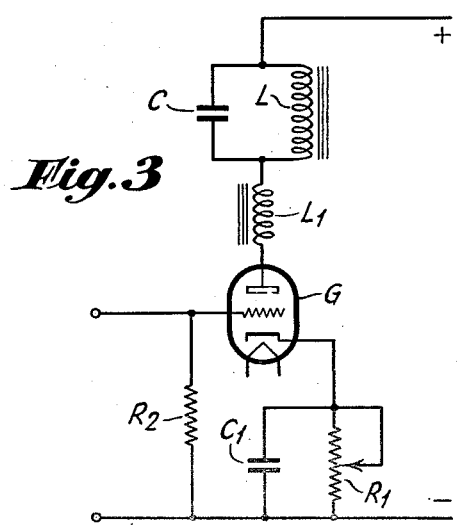

In the embodiment of the invention shown in Fig. 3, suitable for a cathode ray tube employing electrostatic deflection the tuned circuit L, C is placed in the anode circuit of a gas-filled triode G to whose grid a synchronizing signal is supplied by the terminals shown to the left of the grid resistance $R_2$, which resistance is provided to prevent open-circuiting of the grid when the signal of the synchronizing source is removed. The cathode lead of the triode includes a resistance $R_1$ shunted by a condenser $C_1$ for a purpose that will be described later. When the triode "fires" a large voltage is built up across the tuned circuit and the voltage of the triode-anode is reduced to the point at which the triode becomes non-conductive. The tuned circuit L, C commences to oscillate and the voltage of the triode-anode is raised until it reaches the point at which the triode again "fires." Since part of the discharge current through the valve will pass through the inductance (in general the main part will pass through the condenser) when the valve becomes non-conductive and the circuit is left free to oscillate, there will already be a current flowing in the inductance, which will then be diverted from the valve to flow through the condenser. This means that the oscillation will not start from zero circulating current in the tuned circuit (corresponding to zero slope of the voltage curve) but will be from a point on the voltage curve at which the latter is substantially linear. The triode is arranged to fire (by adjustment of the cathode circuit as described later) at a point on the voltage curve where it is still substantially linear. The voltage at the triode-anode and hence across the tuned circuit, which is applied to the cathode-ray tube (not shown), is thus a close approximation to a sawtooth wave. The amplitude is readily adjusted by varying the D. C. voltage supplied. In general the best linearity of wave-form is obtained when the natural frequency of the tuned circuit is not greater than a quarter of the time base frequency. The average current taken from the D. C. supply is dependent upon the value of the condenser C and it is found desirable to maintain the maximum possible value of inductance, taking account of the D. C. through the inductance, so that the condenser may be as small as possible.

The triode is preferably an argon- or helium-filled triode although a mercury-vapor triode may be used at low frequencies. With argon or helium fillings the discharge may be stopped by application of negative bias to the grid when the discharge current is reduced to a low value. The object of the resistance $R_1$ shunted by the condenser $C_1$ in the cathode lead is to provide automatic bias to the grid of the valve. The time constant of $R_1$ and $C_1$ is adjusted so that the passage of the discharge current causes a rise in cathode voltage which persists until the discharge current becomes of a low value; this increase of cathode voltage causes the valve to cease discharging more quickly than if only a steady voltage existed at the cathode. When the discharge ceases the cathode voltage falls to a value suitable for the tripping of the valve at the correct point on the cycle. The values of $R_1$ and $C_1$ determine the frequency of the sawtooth oscillations obtained and $R_1$ is accordingly shown as variable; if the resistance of the anode potential source is low there will be only a small change of amplitude with frequency. Since the condenser C must be charged by way of $C_1$, the latter should be at least 10 times the capacity of the former.

In order to limit the peak discharge current through the valve C it will generally be necessary to insert a resistance and/or an inductance in series with the anode circuit. It is preferable to employ an inductance as shown at $L_1$ in Fig. 3 and this inductance should have such value that the natural frequency of the $L_1C$ circuit is higher than that of LC. This series inductance has the following effects:

(1) The fly-back time of the sawtooth wave is increased.

(2) In addition to limiting the current flowing during the conducting period of the gas triode the inductance limits the variation of this current.

(3) The voltage efficiency, i. e. the ratio of the peak-to-peak value of the sawtooth voltage to the D. C. input voltage, is increased by approximately four times.

The "voltage efficiency" is dependent on the damping present in the circuit. The factor 4 quoted for the increase in efficiency is the result obtained in practice. Theoretically the efficiency could be increased indefinitely by reducing the damping.

Without the choke $L_1$ the peak current would reach much higher values for an equivalent sawtooth voltage to the detriment of the gas triode. The increase in fly-back time which is caused can readily be arranged to be within permissible limits and is thus of no practical importance.

The current through the inductance L differs slightly from that obtaining in the circuit without the choke $L_1$ in that during the fly-back time a current fluctuation of small amplitude occurs, i. e. the sections XY in Fig. 2 are separated by subsidiary curves. However, for all practical purposes (i. e. with short fly-back times) this small fluctuation is negligible.

The result of using the choke $L_1$ is that in practice a voltage efficiency of the order of 5 is obtained. With circuits giving voltages symmetrically balanced to earth potential as described below the voltage efficiency is about 10.

The time base described with reference to Fig. 3, with or without the choke $L_1$, produces an asymmetric sawtooth voltage since one side of the source is effectively at the potential of the anode potential source, i. e. in effect at earth potential.

Figure 4:
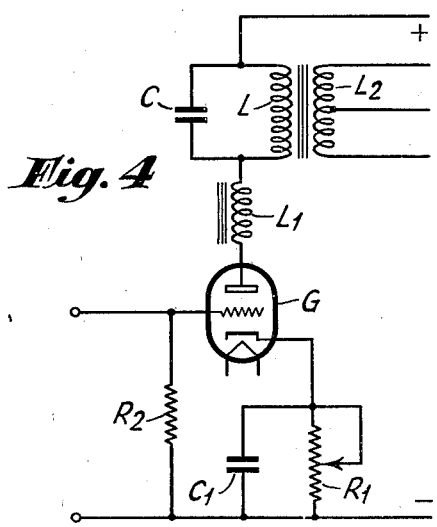

Sawtooth voltages balanced to earth may be obtained as follows:

(1) The inductance L may, as shown in Fig. 4, form the primary of a transformer whose secondary $L_2$ is center-tapped. If the center-tap is then joined to earth the sawtooth voltages appearing at the ends of the secondary $L_2$ will be balanced with respect to earth. In this case the condenser C may be placed across the secondary if a suitable coupling factor is employed.

Figure 5:
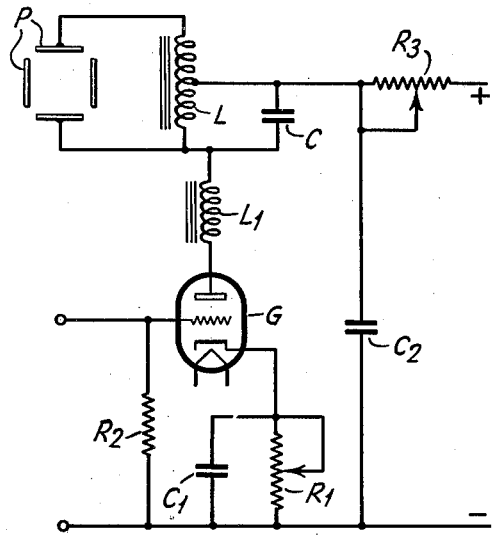

(2) The inductance L may form one half of a center-tapped choke whose center-tap is connected to a source of voltage of comparatively high value as shown in Fig. 5, the other half being preferably not tuned by the addition of a condenser. The sawtooth voltages may be taken from the ends of this choke and will be balanced with respect to earth.

Of the two methods, the second is at present preferred in that it is more economical in the amount of wire used and lends itself more readily than the first to the production of an efficient design.

The lower half of the center-tapped choke in Fig. 5, i. e. the inductance L, may be termed the primary winding and the upper half the secondary winding. The secondary winding with its distributed end stray capacity (hereinafter termed the secondary capacity) forms an oscillatory circuit tightly coupled to the main circuit LC. There are, therefore, two natural frequencies of oscillation. Condenser C is in practice much greater than the secondary capacity so that the two frequencies are widely separated; one is the desired frequency due to the main circuit LC, while the other, which may be termed the parasitic frequency, is the natural frequency of the oscillatory circuit formed by the leakage inductance between the two halves of the choke and the secondary capacity. This parasitic oscillation is only important in the secondary circuit, where it is superimposed on the main sawtooth wave. It is of decreasing importance as its frequency is increased since it is then more easily removable without affecting the sawtooth oscillation. The leakage inductance between the primary and secondary windings and the secondary capacity should be kept to a minimum.

The following methods of adding impedance to the circuit may be used to remove it:

(1) A resistance in series with a condenser is shunted across the secondary, as described later with reference to Fig. 7. The values of the components are best found by experiment; the condenser should have as small a capacity as possible.

(2) Method (1) is modified in that one deflector plate is joined to the junction of the resistance and condenser instead of to the end of the secondary, the resistance being located at the high-potential end of the secondary. A simple low pass filter is thus provided. The condenser should have the minimum possible value. This method appears to cause more phase distortion than (1).

(3) A more effective method than (1) or (2) is to wind the secondary with wire of sufficient resistance to damp out the parasitic oscillation. This method has the advantage that the resistance is distributed. In practice it is found convenient to wind the primary winding (L) with copper wire so as to keep the resistance of the main tuned circuit to a minimum and to wind the secondary winding with resistance wire, e. g. the wire known under the registered British trade-mark "Eureka." If the resistance of the secondary winding is made excessive the "flyback" time of the sawtooth voltage in the secondary winding is unduly long; accordingly the resistance of the secondary winding must be adjusted between two limits; it must be sufficiently high to damp out the parasitic oscillation and not so high as to lengthen the fly-back time unduly. A suitable value of resistance is one approximately equal to the square root of the ratio of the leakage inductance between the two halves of the choke to the secondary capacity; this value is efficient in preventing parasitic oscillations without unduly increasing the fly-back time and without introducing any appreciable damping into the main tuned circuit.

Figure 6:
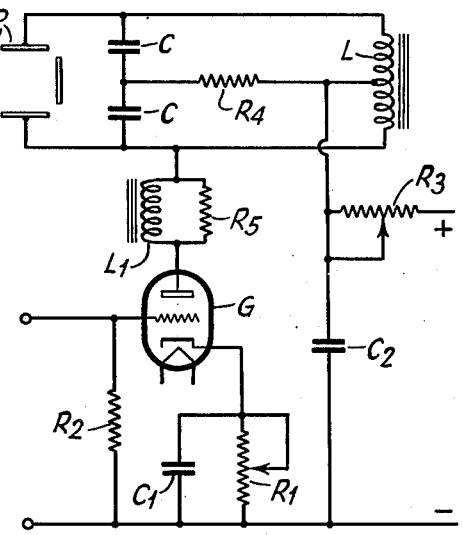

(4) A resistance is connected at one end to the center tapping of the choke and at the other end is connected to the junction of two condensers connected in series across the whole length of the choke, these condensers (or an equivalent tapped condenser) forming the capacity of the tuned circuit. In Fig. 6 this resistance is shown at $R_4$. Instead of using a single resistance connected to the center tapping of the choke we may use a plurality of resistances. For example, if a series combination of four condensers (or an equivalent tapped condenser) is connected across the choke three resistances may be connected to the junction points of these condensers, the center resistance being connected at its other end to the center tapping of the choke and the others to points symmetrically spaced therefrom.

The parasitic oscillation may, of course, arise with any other form of magnetic coupling to the LC circuit for the production of symmetrical voltages and similar remedies may then be used.

Figs. 5 and 6 show diagrammatically the deflecting plates P of the cathode ray tube. Fig. 6 also shows the choke $L_1$ shunted by a resistance $R_5$.

As already stated, variation of amplitude may be readily accomplished by adjusting the applied D. C. voltage. If the system is to be operated from a D. C. line of fixed voltage, a variable resistance $R_3$ decoupled by a suitable condenser $C_2$ may be inserted between the time base and the D. C. supply as shown in Figs. 5 and 6; this results in a variation of amplitude with frequency but in time bases for television receivers and other instances where the frequency is fixed this variation is of no importance and the simple control indicated is accordingly permissible.

The variation of frequency with amplitude which occurs may be reduced by connecting a suitable resistance from the positive D. C. line to the cathode of the gas triode. The value of this resistance is best adjusted experimentally to suit the type of gas triode used, the method of synchronizing employed, and the D. C. line voltage.

Before the gas triode conducts the grid-to-cathode impedance is high. When ionization occurs the negative bias on the grid results in a large grid current due to the positive ion sheath. It is desirable to allow this grid current to flow but to control its value by a resistance in the grid circuit. The value for the total external grid resistance should not be too high since this may result in the production of an upper frequency limit above which the time base is not self-starting.

Since the grid-cathode impedance is high during the main part of the sawtooth, a small synchronizing voltage in the grid circuit is sufficient to lock the time base once the frequency has been adjusted. If synchronizing is effected by a sine-wave supply a fraction of a volt is sufficient. The resistance of the synchronizing source should be such as to satisfy the grid circuit conditions stated above.

Figure 7:
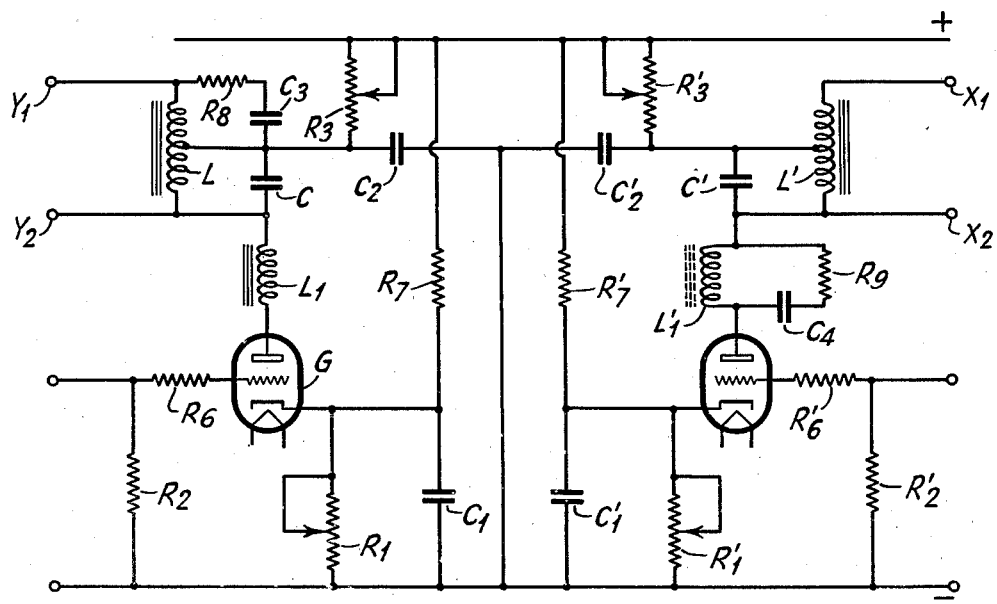

Fig. 7 represents a double-time base circuit that has given successful experimental results with the component values given below in a television set for the reception of the 405-line 50-frame interlaced signals radiated at the present date by the British Broadcasting Corporation. The circuit will be seen to be, generally speaking, a duplication of that shown in Fig. 5. The frame time base (frequency 50 c. p. s.) is shown at the left, the references of the components corresponding to those shown in Fig. 5 being the same as in that circuit, and the line time base (frequency 10,125 cycles per second) is shown at the right; the components of the line time base that correspond to those in Fig. 5 bear "dashed" references, i. e. G', for example, is the gas filled triode of the line time base corresponding to the triode G of Fig. 5 or of the frame time base. The following differences with respect to Fig. 5 will be noted:

(1) The inclusion of series resistances $R_6$, $R_6'$ in the grid leads; these are required only when the total resistance in the grid circuit is otherwise incorrect.

(2) The connection of resistances $R_7$, $R_7'$ between the positive D. C. line and the triode cathodes, the purpose of which has already been explained.

(3) The use of a resistance $R_8$ in series with a condenser $C_3$ across the "secondary" winding of the inductance L for the purpose of damping out parasitic oscillations.

(4) The use of a resistance $R_9$ in series with a condenser $C_4$ across the choke $L_1'$; this expedient is adopted to prevent the choke oscillating due to its self-capacity. Other forms of impedance may, of course, be used for this purpose.

In the experiments referred to the D. C. supply was 250 volts and the triodes were filled with helium at a pressure of about 1 mm. of mercury, the anodes being screened. The resistances and condensers had the following values:

$R_1=R_1'=0$ to 5,000 ohms
$R_2=50,000$ ohms
$R_2'=20,000$ ohms
$R_3=R_3'=0$ to 20,000 ohms
$R_6=R_6'=5,000$ ohms
$R_7=R_7'=160,000$ ohms
$R_8=160,000$ ohms
$R_9=6,400$ ohms
$C=0.4$ μf.
$C'=0.002$ μf.
$C_1=32$ μf.
$C_1'=0.2$ μf.
$C_2=C_2'=32$ μf.
$C_3=0.005$ μf.
$C_4=0.0005$ μf.

The center-tapped choke for the frame circuit consisted of 26000 turns of 38 SWG enamelled copper layer-wound, without insulation between the layers, on a gapped core of iron stampings to give an inductance in the lower half of 300 henries and a total inductance of 1200 henries with a direct current of 15 ma. in the lower half. The choke $L_1$ was constituted by 800 turns of 0.2 mm. enamelled copper wire layer-wound on a gapped core, the layers being interleaved with paper; its inductance is 0.3 henry when measured with A. C. excitation of 1 to 2 volts. The center-tapped choke for the line circuit was layer-wound on an ungapped core formed of 0.02 mm. stampings of the material sold under the registered British trade-mark "Rhometal." The primary winding consisted of 2000 turns of 0.15 mm. enamelled copper, the layers being interleaved with paper, and the secondary winding (placed outside the primary) consisted of 2000 turns of 0.061 mm. wire of the material sold under the registered British trade-mark "Eureka," the layers thereof being interleaved with waxed paper and the turns in each layer being well spaced. The inductance of the primary is 15 henries with an A. C. excitation of 50 v., 400 c. p. s. and the total inductance 60 h. with 15 ma. D. C. in the lower half. The coil $L_1'$ consisted of 280 turns of 0.2 mm. enamelled copper on a dust core, giving an A. C. inductance of 0.003 henry; an air-cored coil may also be used.

Although we do not desire to be limited to any particular values we may remark that in the use of time bases as described above for producing voltages balanced to earth we have found it possible to produce peak-to-peak voltage values of the order of 75 to 100 times the value in milliamperes of the mean D. C. current through the triode and to produce peak-to-peak voltages up to 2500 volts with a 250 volt D. C. supply.

The time-base circuits hereinbefore described are applicable to cathode-ray tubes employing electrostatic deflection. Such circuits may be made applicable to tubes with magnetic deflection by inductively coupling to the inductance L a coil which is connected to the deflecting coil; if the deflecting coil has an inductance which is high compared with its resistance it may be necessary to couple the anode circuit to the grid by a phase-adjusting circuit consisting, for example, of a series combination of resistance and capacity connected between the tuned circuit and the grid.

Alternatively the desired sawtooth current for magnetic deflection may be obtained by circuits, differing from those described above, in which a linear portion of a current wave is "extracted" instead of a linear portion of a voltage wave.

Although we have referred in the above examples to the condenser C as being directly connected across the inductance L this condenser may equally as well be connected between the lower end of L and the "earthy" side of the circuits, i. e. the lower end of the bias circuit and the negative side of the H. T. source.

What we claim is:

1. An oscillation generator comprising a thermionic vacuum tube having anode, cathode, and at least one control electrode, a resonant circuit connected in the anode-cathode circuit of the tube and comprising an inductance connected in parallel with two serially connected condensers, a resistive member connecting the center portion of said inductive member to the common pole of said condensers, a condenser connected to the center portion of said inductive member and serially connected with the anode and cathode of said tube, means for energizing the anode of said tube, a variable resistor interposed between said energizing means and said anode, a second inductive member, a resistive member connected in parallel with said second inductive member, said parallel circuit being connected in the anode-cathode circuit of said thermionic tube, a time constant circuit connected in the anode-cathode circuit of said tube and in the control electrode-cathode circuit of said tube, and means for intermittently impressing impulses through an external source onto the control electrode-cathode circuit of said tube.

2. Apparatus in accordance with claim 1 wherein said thermionic tube comprises a gaseous discharge device.

CHARLES CECIL EAGLESFIELD.
JOHN ARCHER.